United States Patent [19]
Okuyama

[11] Patent Number: 5,940,232
[45] Date of Patent: Aug. 17, 1999

[54] INFORMATION-SIGNAL RECORDING APPARATUS, INFORMATION-SIGNAL REPRODUCING APPARATUS AND INFORMATION-SIGNAL RECORDING AND REPRODUCING APPARATUS

[75] Inventor: Takehiko Okuyama, Kanagawa-ken, Japan

[73] Assignee: Kabushiki Kaisha Toshiba, Kawasaki, Japan

[21] Appl. No.: 08/901,327

[22] Filed: Jul. 28, 1997

Related U.S. Application Data

[63] Continuation of application No. 08/312,191, Sep. 26, 1994, abandoned.

[30] Foreign Application Priority Data

Sep. 29, 1993 [JP] Japan ................................. 5-242690

[51] Int. Cl.⁶ ........................................... G11B 5/86
[52] U.S. Cl. ............................................. 360/15; 360/69
[58] Field of Search .................. 360/69, 71, 15, 360/61, 33.1

[56] References Cited

U.S. PATENT DOCUMENTS

| | | | |
|---|---|---|---|
| 4,338,644 | 7/1982 | Staar | 360/69 |
| 4,339,776 | 7/1982 | Langer et al. | 360/69 |
| 4,597,058 | 6/1986 | Izumi et al. | 364/900 |
| 4,672,554 | 6/1987 | Ogaki | 364/479 |
| 4,794,467 | 12/1988 | Okuyama | 360/15 |
| 5,636,078 | 6/1997 | Tsai | 360/72.1 |

FOREIGN PATENT DOCUMENTS

| | | |
|---|---|---|
| 0246661 | 11/1987 | European Pat. Off. . |
| 0424653 | 9/1990 | European Pat. Off. . |
| 0449607 | 10/1991 | European Pat. Off. . |
| 2091515 | 7/1982 | United Kingdom . |
| WO92/22983 | 12/1992 | WIPO . |

OTHER PUBLICATIONS

Belgium Patent Abstract No. BE879620, Staar, Oct. 25, 1979.
Ide et al: Data Compression and Digital Modulation: Nikkei Electronics Books, Cap 1, pp. 137–150 (1993).

*Primary Examiner*—Andrew L. Sniezek
*Attorney, Agent, or Firm*—Pillsbury Madison & Sutro LLP

[57] ABSTRACT

A microcomputer reads out cassette management information from an IC memory on a cassette to give the same to a D-IF formatter. The D-IF formatter outputs the cassette management information by a digital interface format which packages a reproducing digital image and audio signals from an error correction circuit, and a sub-code and the cassette management information. Upon dubbing recording, a separation circuit extracts the cassette management information from dubbing input to give the same to the microcomputer. The microcomputer creates the cassette management information corresponding to a program to be dubbed, on the basis of the inputted cassette management information, to store the same into the IC memory. In this manner, upon dubbing, the image and audio information is recorded on a tape, and the cassette management information is automatically recorded on the IC memory. Thus, complicated information input of a user is dispensed with.

12 Claims, 12 Drawing Sheets

FIG.3

| CASSETTE NUMBER | 3 |
|---|---|
| TAPE LENGTH | 4H |
| TAPE TYPE | . . . . |

| TITLE | GENRE | TV CHANNEL | RECORDED DATE | RECORDING START TIME CODE | . . . |
|---|---|---|---|---|---|
| TITLE 1 | 0 | 6 | 930614 | 0 : 00 : 05 | • |
| TITLE 2 | 3 | 10 | 930614 | 0 : 50 : 30 | • |
| TITLE 3 | 1 | 8 | 930617 | 2 : 00 : 05 | • |
| TITLE 4 | 5 | 1 | 930619 | 2 : 34 : 13 | • |
| ⋮ | ⋮ | ⋮ | ⋮ | ⋮ | ⋮ |

0 : NEWS
1 : SPORTS
2 : DRAMA
3 : PICTURE
•
•
•

FIG.7

| CASSETTE NUMBER | 5 |
|---|---|
| TAPE LENGTH | 2H |
| TAPE TYPE | . . . . |

| TITLE | GENRE | TV CHANNEL | RECORDED DATE | RECORDING START TIME CODE | . . . |
|---|---|---|---|---|---|
| TITLE 2 | 3 | 10 | 930614 | 0 : 00 : 00 | . |
| TITLE 3 | 1 | 8 | 930617 | 1 : 09 : 35 | . |
| TITLE 6 | 3 | 4 | 930530 | 1 : 43 : 43 | . |
| ⋮ | ⋮ | ⋮ | ⋮ | ⋮ | ⋮ |

FIG.13
(RELATED ART)

| CASSETTE NUMBER | 3 |
|---|---|
| TAPE LENGTH | 4H |
| TAPE TYPE | .... |

| TITLE | GENRE | TV CHANNEL | RECORDED DATE | RECORDING START TIME CODE | ... |
|---|---|---|---|---|---|
| TITLE 1 | 0 | 6 | 930614 | 0 : 00 : 05 | • |
| TITLE 2 | 3 | 10 | 930614 | 0 : 50 : 30 | • |
| TITLE 3 | 1 | 8 | 930617 | 2 : 00 : 05 | • |
| TITLE 4 | 5 | 1 | 930619 | 2 : 34 : 13 | • |
| ⋮ | ⋮ | ⋮ | ⋮ | ⋮ | ⋮ |

5,940,232

INFORMATION-SIGNAL RECORDING APPARATUS, INFORMATION-SIGNAL REPRODUCING APPARATUS AND INFORMATION-SIGNAL RECORDING AND REPRODUCING APPARATUS

This is a continuation of application Ser. No. 08/312,191, filed on Sep. 26, 1994.

BACKGROUND OF THE INVENTION

1. Field of the Invention

The present invention relates to an information-signal recording apparatus, an information-signal reproducing apparatus and an information-signal recording and reproducing apparatus, which are capable of performing dubbing.

2. Related Art And Prior Art Statement

In recent years, a cassette management system has been developed in which the contents of a plurality of programs, which are recorded in a cassette video tape, are automatically displayed on a television image plane or a cassette body. A VTR (video tape recorder) which loads this system has also been merchandised. When a library of the cassette video tapes increases, it becomes difficult to determine both how and where a desired program is stored on the cassette tapes. The cassette management system therefore displays management information for every recording to facilitate retrieval operation of a user.

Various methods have been used to implement the cassette management system. For example, there is a method in which a non-volatile memory is provided in a VTR body, and the contents thereof are stored in correspondence with numbers of all the cassettes. However, when many cassettes need to be managed, the memory capacity must correspondingly increase. Accordingly, a method using a recording medium on the side of the cassette is normally adopted. For example, exclusive or dedicated bar code labels can be stuck to the cassettes, an IC memory can be attached to the cassettes, or the like.

FIG. 11 is an explanatory view showing an example of the former where exclusive or dedicated labels are stuck to the cassettes.

As shown in FIG. 11, a cassette deck body 1 is provided with a bar code reading/writing section 2. When the cassette tape 3 is loaded, a label 5 which is stuck onto the cassette 3 is positioned against the bar code reading/writing section 2, and a bar code 4 on the label 5 is read by the bar code reading/writing section 2. Cassette management information is recorded on the bar code 4. The cassette management information is displayed on, for example, an image plane based on a signal from the bar code reading/writing section 2.

The bar code reading/writing section 2 can also record cassette management information when the cassette 3 is loaded. During or after a program is recorded, the bar code reading/writing section 2 records the cassette management information onto the label 5 which is stuck to the cassette 3, as the bar code 4. At that time, the cassette information is recorded automatically, on the basis of remote-control input from the user, or the like. In connection with the above, when the recorded contents are changed or modified, the labels are changed or covered, and recording is performed.

FIG. 12 is an explanatory view showing an example in which an IC memory is mounted on the cassette.

As shown in FIG. 12, an IC memory 7 is attached to a cassette 6. The IC memory 7 is connected to metal contacts 8 that are provided on a surface of the cassette 6. A deck body 9 has metal contact portions 10 which short-circuit with the metal contacts 8 on the surface of the cassette 6 when the tape is loaded. A CPU (not shown) transmits data and a clock with respect to the IC memory 7 through the metal contact portions 10. Consequently, the CPU reads cassette management information which is stored in the IC memory 7 and writes desired cassette management information to the IC memory 7.

FIG. 13 is an explanatory view for the description of the cassette management information.

As shown in FIG. 13, the cassette management information includes a cassette number, a tape length, a tape type, a title, a genre, a channel (TV channel), picture-recorded data, picture-recording start time code, and the like. Of these, the picture-recorded date, the channel picture-recorded, the time code that represents picture-recorded recording position of the tape, picture-recording time, and the like are automatically recorded by the VTR upon tape picture-recording. Meanwhile, the title, the genre of the program and the like are recorded by, for example, remote-control input of a user or the like. In connection with the above, when transmission codes such as a program name or the like are subsequently added to a television-broadcasting signal and are transmitted, automatic recording of those codes may also be performed.

In the system shown in FIGS. 11 and 12, the cassette management information is not magnetically recorded on the tape. Rather, it is recorded on a cassette management information recording medium such as bar code label, an IC memory, or the like. For this reason, the user can display the cassette management information only when the cassette is loaded, or only when the cassette is mounted on the deck. The cassette management information may be displayed without reproducing the tape. Accordingly, retrieval of the desired program is easy. Moreover, this system achieves increased cassette capacity, increased data reliability, and increased data processing when compared with systems recording cassette management information only the tape. Furthermore, the design is simplified. For these reasons, as the cassette management system, a method of recording the cassette management information onto the cassette management recording medium other than the tape was implemented, as shown in FIGS. 11 and 12.

When the contents which are recorded onto an 8 mm or a VHS-C cassette are recorded onto a deferred VTR of a VHS system, or the like, dubbing is generally performed. Dubbing is performed by recording the contents of one tape onto a second tape. To achieve dubbing, a device on the reproduction side and a device on the recording side are connected to each other by an image cable, an audio cable, an RF cable or the like. A reproducing signal from the tape on the reproduction side is given as a line input to the device on the recording side, and recording is performed on the tape on the recording side.

Furthermore, in addition to the connecting terminals of these image, audio and RF cables, a digital recording VTR has a digital interface (hereinafter, referred to as "digital I/F"). The image and audio data and the sub-codes, such as the time codes, are reproduced from the tape on the reproducing side and supplied to the device on the recording side, through the digital I/F. The device on the recording side processes the inputted digital data, error correction codes are added to the signals, and the signal is recorded on the tape.

FIG. 14 is an explanatory view showing an example of an interface format of the data which is transmitted through such a digital interface.

In the digital interface format shown in FIG. 14, data of a single frame are divided into n units which are packaged. A header is added to the top of each unit of packaging data. Then, sub-code information is arranged. The header includes data such as synchronous information for transferring the data among devices. Subsequently, the image and audio information is arranged at a predetermined arrangement in order of signal processing.

For example, in a DIVTR that is a broadcasting digital recording VTR, assume that a 4: 2: 2 interface format is adopted in accordance with a recommendation by CCIR. This system transmits image signals, audio signals, and a timing reference signal or the like in synchronism with the image data. Further, in a CD, a DAT or the like, an EIAJ (Japan Electronic Machine Industry) digital audio interface standard is adopted. Under this standard, the audio information, the sub-code information or the like are transmitted. Upon dubbing, the reproducing signal from the device on the reproducing side is inputted through the digital interface to the device positioned on the recording side, the reproducing signal being encoded in accordance with the recording format of the device on the recording side and is recorded onto the tape.

However, in the aforesaid dubbing method, the only information which is recorded onto the tape is that which is reproduced by the device on the reproducing side. The management information recorded onto the IC memory, the bar code label or a like recorded medium separate from the tape is not recorded during dubbing. For this reason, the dubbing operation requires additional re-recording of not only the cassette management information recorded by the user, such as the title, the genre or the like, but also the cassette management information automatically recorded by the VTR such as the TV channel, the recorded date, the time code or the like. This is extremely troublesome.

OBJECTS AND SUMMARY OF THE INVENTION

An object of the invention is to provide an information-signal recording apparatus, an information-signal reproducing apparatus and an information-signal recording and reproducing apparatus, which are capable of recording also cassette management information which is recorded onto a cassette management information recording medium, upon dubbing of tape information.

Moreover, another object of the invention is to provide an information-signal recording apparatus, an information-signal reproducing apparatus and an information-signal recording and reproducing apparatus, which are capable of recording also cassette management information which is recorded onto a cassette management information recording medium, upon dubbing of tape information.

Moreover, another object of the invention is to provide an information-signal recording apparatus, an information-signal reproducing apparatus and an information-signal recording and reproducing apparatus, which are capable of automatically recording cassette management information upon dubbing of tape information.

Furthermore, an object of the invention is to provide an information-signal recording apparatus, an information-signal reproducing apparatus and an information-signal recording and reproducing apparatus, which are capable of determining when the remaining recording capacity of a tape on the recording side is less than the reproducing time of a program to be dubbed and for warning of such a condition when detected, prior to dubbing.

According to the invention, there is provided an information-signal recording and reproducing apparatus comprising a reproducing device for reading out and outputting dubbing information recorded onto a predetermined recording medium which is housed within a cassette on a reproducing side, and cassette management information recorded onto a predetermined cassette information recording medium which is provided on the cassette on the reproducing side, and a recording device for recording the inputted predetermined dubbing information onto a predetermined recording medium which is housed within the cassette on the recording side and for recording cassette management information associated with the dubbing information, onto a predetermined cassette information recording medium which is provided on the cassette on the recording side.

Further, according to the invention, there is provided an information-signal reproducing apparatus comprising reproducing means for reproducing a predetermined recording medium which is housed within a predetermined cassette to output dubbing information, cassette management information reading-out means for performing communication of cassette management information with respect to a predetermined cassette management information recording medium provided on the cassette, and first transmission means for multiplexing the cassette management information onto the dubbing information to output the same as a dubbing output.

Moreover, according to the invention, there is provided the information-signal recording apparatus comprising recording means for performing recording onto a predetermined recording medium which is housed within a predetermined cassette on the basis of dubbing information, cassette-management-information writing means for performing communication of cassette management information with respect to a predetermined cassette-management-information recording medium which is provided on the cassette, and separation means to which the dubbing information and the cassette management information are given, for separating the dubbing information from the dubbing input to give the same to the recording means and to give the cassette management information associated with the dubbing information, to the cassette-management-information writing means to record the cassette management information onto the cassette management information recording medium upon dubbing.

These and other objects and advantages of the present invention will become further apparent from the following detailed explanation.

BRIEF DESCRIPTION OF THE DRAWINGS

FIG. 3 is an explanatory view for the description of cassette management information;

FIG. 7 is an explanatory view for the description of the cassette management information;

FIG. 13 is an explanatory view for the description of the cassette management information.

DETAILED DESCRIPTION OF THE PREFERRED EMBODIMENTS

Figure 1:
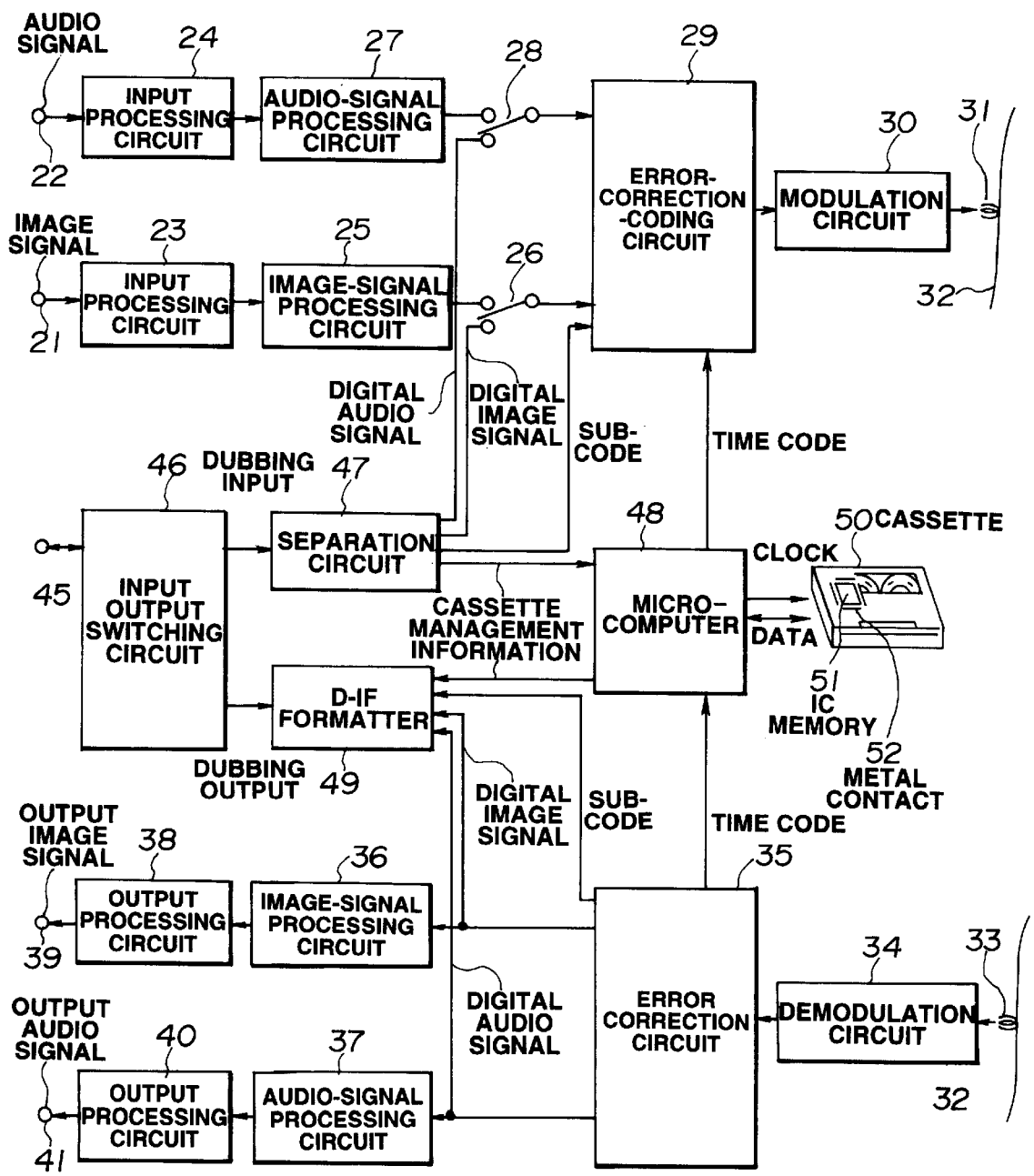
FIG. 1 is a block diagram showing an embodiment of an information-signal recording and reproducing apparatus according to the invention.

FIG. 1 is a block diagram showing an embodiment of an information-signal recording and reproducing apparatus according to the invention. The present embodiment is applied to a digital recording VTR.

An image signal and an audio signal are inputted respectively into input terminals 21 and 22. The image signal and the audio signal are given respectively to input processing circuits 23 and 24. The input processing circuit 23 inverts the image signal to a digital signal and provides the same to an image-signal processing circuit 25. The image-signal processing circuit 25 performs digital signal processing such as shuffling, compressive processing or the like on the digital image signal and provides the same to a terminal a of a switch 26. Meanwhile, the input processing circuit 24 converts the inputted audio signal to a digital signal and provides the same to an audio-signal processing circuit 27. The audio-signal processing circuit 27 performs digital signal processing on the digital audio signal and, thereafter, the audio-signal processing circuit 27 performs time axis conversion thereupon and outputs the same to a terminal a of switch 28.

The digital image signal and the digital audio signal from switches 26 and 28 are given to an error-correction-coding circuit 29. The error-correction-coding circuit 29 adds an error correction code to the digital image signal and the digital audio signal and, thereafter, packages the same. In this case, a sub-code from a separation circuit 47 and a time code from a microcomputer 48 (to be described subsequently) are also given to the error-correction-coding circuit 29. These data are also packaged and are outputted to a modulation circuit 30.

Figure 2:
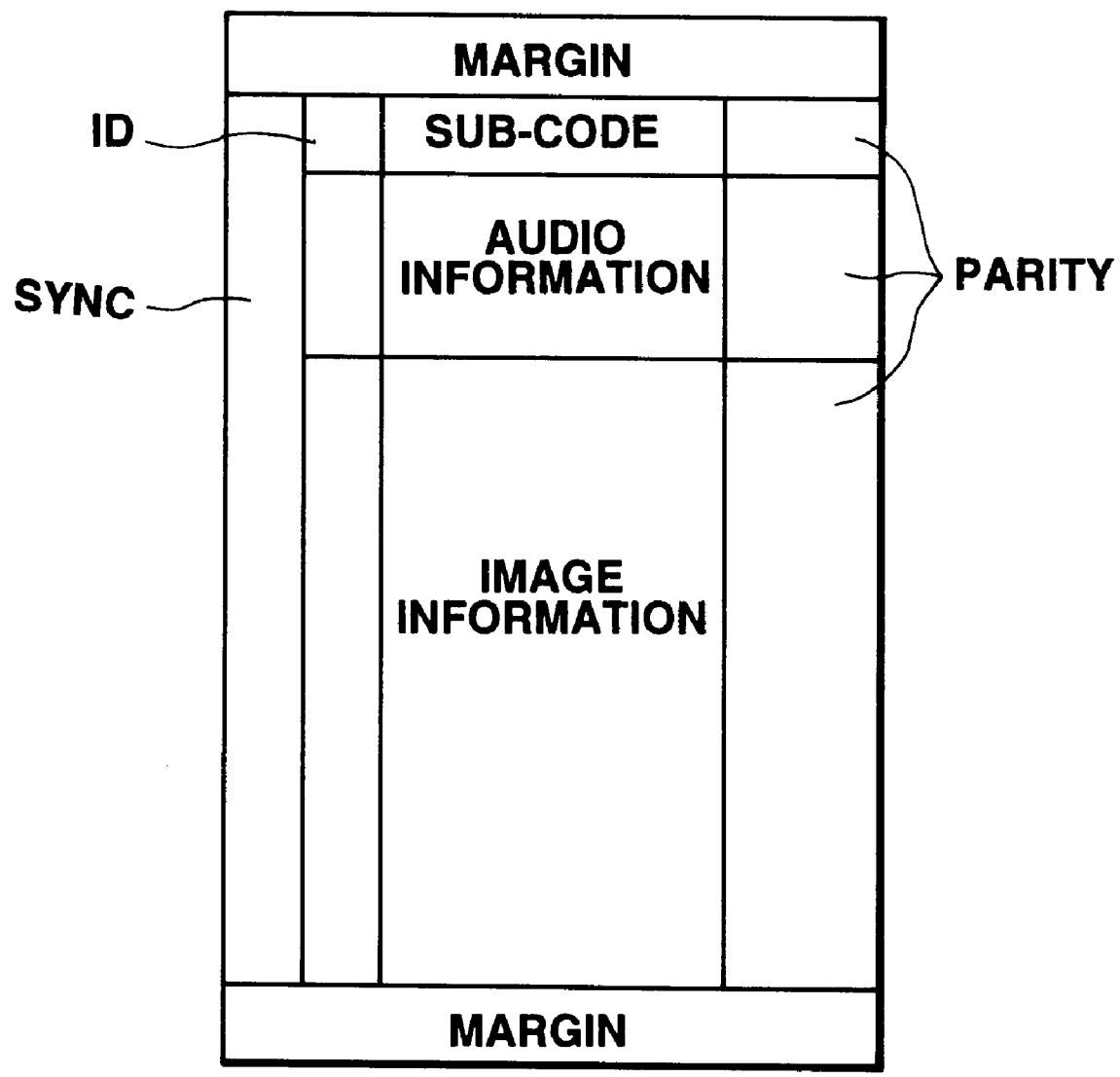
FIG. 2 is an explanatory view for the description of packing due to a modulation circuit 30 in FIG. 1.

FIG. 2 is an explanatory view for the description of the packaging or package due to the error-correction-coding circuit 29 and the modulation circuit 30. The packaging data shown in FIG. 2 corresponds to a single recording track of the magnetic tape that is the recording medium.

As shown in FIG. 2, margins are provided respectively at the top and the rear of a single packing data. The sub-code, the audio information and the image information are arranged after top margin. The sub-code, the audio information and the image information are arranged in order of a synchronous signal (SYNC) unit. Each sync unit is arranged such that the sync is arranged at the top, ID is next arranged, various information or the image information is next arranged and, finally, parity is added thereto.

An output from the error-correction-coding circuit 29 is given to the modulation circuit 30. The modulation circuit 30 applies modulation to the inputted data suitable for recording, and outputs the same to a magnetic head 31 for recording onto a tape 32. Thus, the arrangement is such that the recording track is formed on the tape 32 by the code arrangement shown in FIG. 2.

Meanwhile, in a reproducing system, a magnetic head 33 reproduces the signal which is recorded onto a tape 32 to give the same to a modulation circuit 34. The modulation circuit 34 modulates the reproducing signal and outputs the same to an error correction circuit 35. The error correction circuit 35 uses an error correction code which is included in the reproducing signal, to perform error correction. The error correction circuit 35 separates the time code, the sub-code, the digital image signal and the digital audio signal from each other and outputs the same to the microcomputer 48, a D-IF formatter 49, an image-signal processing circuit 36 and an audio-signal processing circuit 37, respectively.

The image-signal processing circuit 36 applies predetermined digital processing to the digital image signal and outputs the same to an output processing circuit 38. The output processing circuit 38 returns the digital image signal to the analog signal and outputs the image signal to an output terminal 39. Further, the audio-signal processing circuit 37 applies predetermined digital processing to the digital audio signal and outputs the same to an output processing circuit 40. The output processing circuit 40 returns the digital audio signal to the analog signal and outputs the same through an output terminal 41.

In the present embodiment, the deck body (not shown) has a metal contact (not shown) which is connected to a metal contact 52 on a cassette 50 by mounting of the cassette 50, and the metal contact is connected to the microcomputer 48. An IC memory 51 is adhered to, or mounted on, the cassette 50. A data bus and clock terminal (not shown) of the IC memory 51 are connected to the metal contact 52. Thus, transmission of the data and the clock is made possible between the microcomputer 48 and the IC memory 51 through the metal contact 52 on the cassette 50 and the metal contact of the deck body. The IC memory 51 can record the cassette management information regarding the program which is recorded on the cassette tape of the cassette 50.

FIG. 3 is an explanatory view for the description of the cassette management information which is to be recorded on the IC memory 51 in FIG. 1.

As shown in FIG. 3, the cassette number, the tape length, the tape type, the title, the genre, the TV channel, the recorded date, the recording start time code and the like are arranged to be recorded onto the IC memory 51 as the cassette management information. In FIG. 3, the cassette number for the cassette 50 is three (3), and the tape length is four (4) hours. Moreover, it is indicated that the program of TITLE 3 has a genre of 1 (sports), and is the $8^{\underline{th}}$ (eighth) channel in which recording starts from a position of time code: 2:00:05, on Jun. 17, 1993.

In the present embodiment, the arrangement is such that the microcomputer 48 reads out the cassette management information from the IC memory 51, and the cassette management information is given to the D-IF formatter 49. The sub-code, the digital image signal and the digital audio signal are also given to the D-IF formatter 49 from the error correction circuit 35. The D-IF formatter 49 arranges these data on the basis of the predetermined digital interface format.

Figure 4:
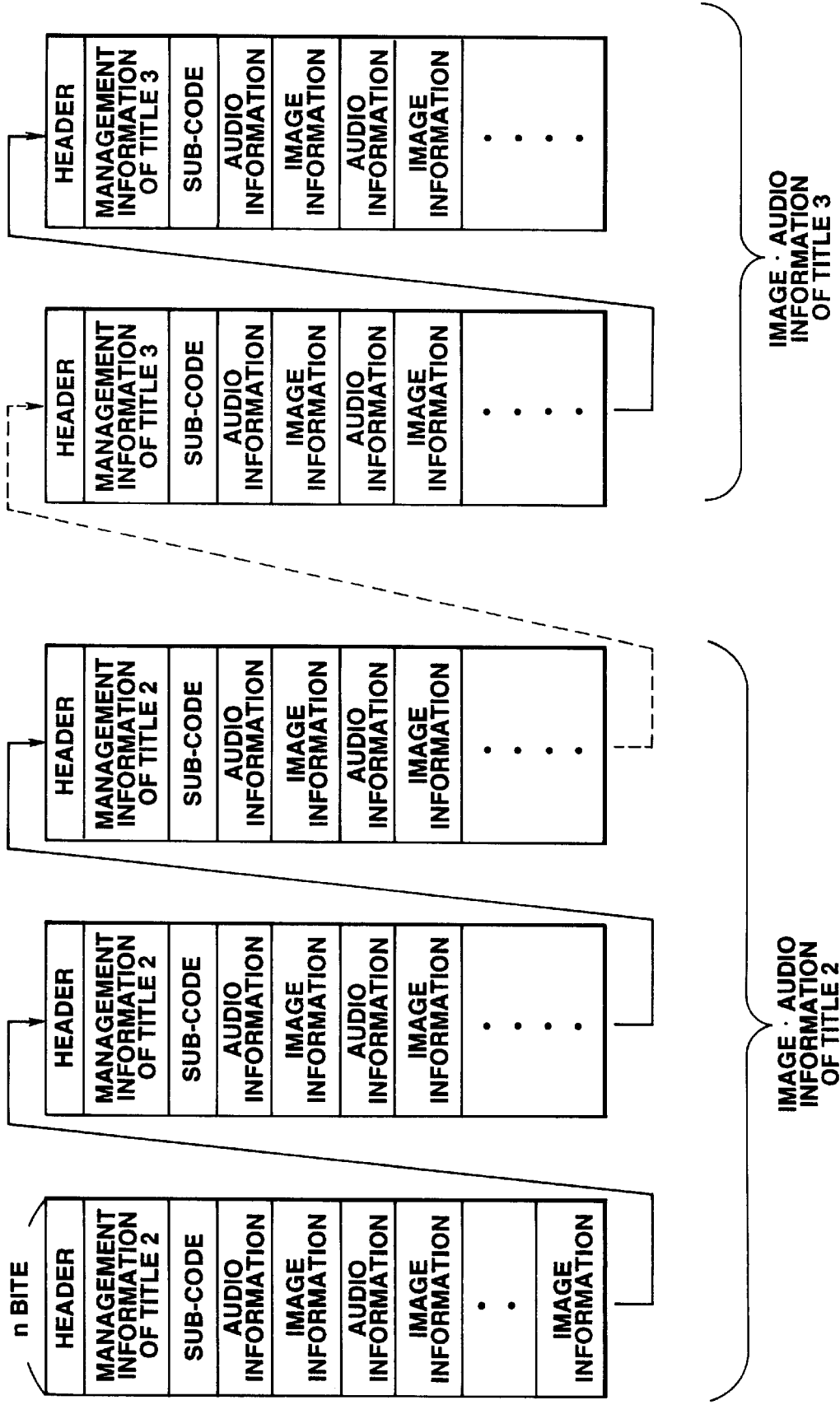
FIG. 4 is an explanatory view for the description of a format due to a D-IF formatter 49 in FIG. 1.

FIG. 4 is an explanatory view for the description of the format due to the D-IF formatter in FIG. 1.

The D-IF formatter 49 packages the cassette management information, the sub-code, the image information and the audio information. A header is added to the top of each of the packing data. Subsequently, arrangement is made in order of the management information of the predetermined title, the sub-code, the audio information, the image information, the audio information, the image information . . . . The header is formed by n bites, the management information is formed by n×k1 bites, and the sub-code is formed by n×k2 bites. The arrangement is such that the information of a plurality of titles is packaged by predetermined data lengths. The information of each of the titles is formed by a plurality of packing data. FIG. 4 shows an example in which the title is such that the information of TITLE 2 and the information of TITLE 3 are packaged.

Figure 5:
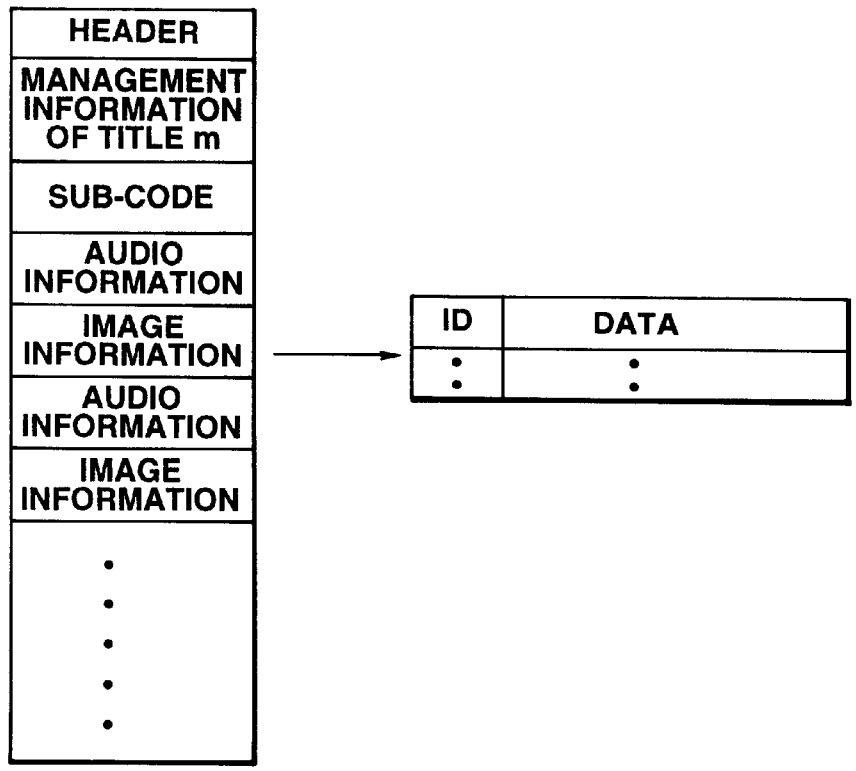
FIG. 5 is an explanatory view for the description of the format due to the D-IF formatter 49 in FIG. 1.
Figure 6:
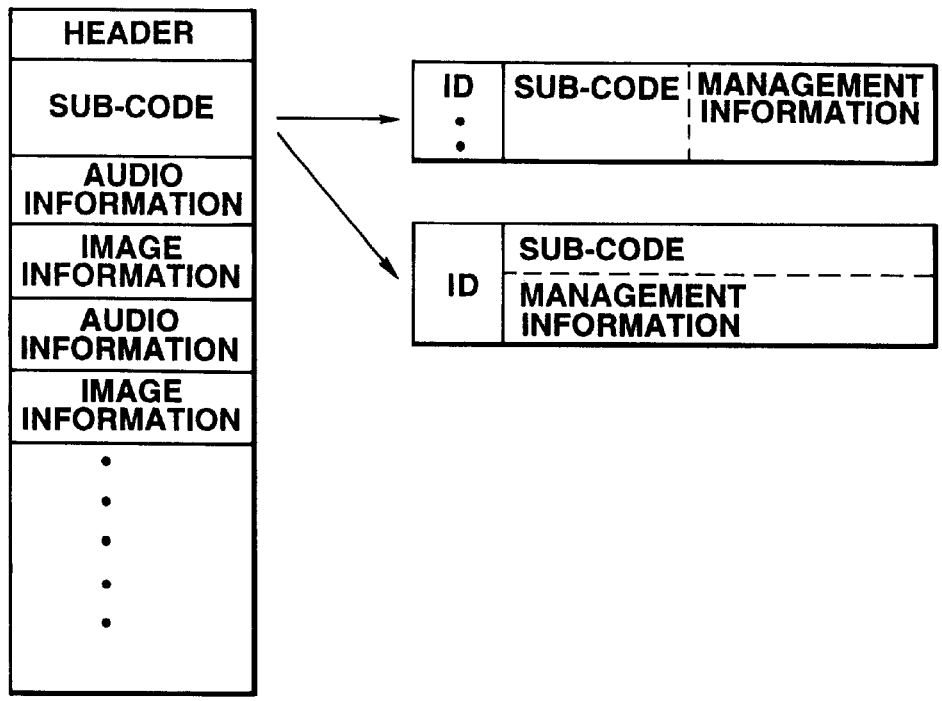
FIG. 6 is an explanatory view for the description of the format due to the D-IF formatter 49 in FIG. 1.

In connection with the above, as shown in FIG. 5, each of the management information is formed by a plurality of (ID+management information) units with the n bites which have the ID and the data serving as a single unit. Further, in consideration also of the fact that the amount or quantity of information of the sub-code is relatively low or small, the cassette management information may be arranged in a sub-code area or region, as shown in FIG. 6. A right-upper portion in FIG. 6 shows an example in which the ID, the sub-codes and the management information are formed by n bites, while a right-lower portion in FIG. 6 shows an example in which the ID and the sub-code are formed by n bites, and the ID and the management information are similarly formed by n bites.

The information which is formatted by the D-IF formatter 49 corresponding to such digital interface is output to the input/output switching circuit 46 as a dubbing output. The input output switching circuit 46 outputs an output from the D-IF formatter 49 to a digital interface (I/F) 45 upon dubbing output.

A dubbing input from the other deck is also inputted to the digital I/F 45. The dubbing input that is inputted through digital I/F 45 includes the audio information, the image information, the sub-code and the cassette management information. An input/output switching circuit 46 gives these digital signals to the separation circuit 47 upon dubbing input. The separation circuit 47 separates the digital image signal, the digital audio signal and the sub-code from each other to output the same to terminals b of the respective switches 26 and 28 and the error-correction-coding circuit 29. The separation circuit 47 separates the cassette management information from each other to output the same to the microcomputer 48. Upon dubbing, the digital image signal and the digital audio signal from the other deck are inputted through the digital I/F formatter 49. The switches 26 and 28 select the terminal b, whereby these digital signals are recorded.

The cassette management information, in accordance with the contents which are dubbed, is given to the microcomputer 48. The information of the title, the genre, the TV channel and the picture-recorded date is given to the IC memory 51 and is stored therein. In this connection, the arrangement is such that the microcomputer 48 generates an information of the time code in accordance with the picture-recording start position of the cassette 50 on the recording side and outputs information recording the time code to the IC memory 51.

Operation of the embodiment arranged in this manner will next be described with reference to the explanatory view of FIG. 7. FIG. 7 is an explanatory view showing the cassette management information which is stored in the IC memory 51 on the recording side at the time when the image and audio information of TITLE 2 and 3 in FIG. 3 are dubbed to perform recording from the top position of the tape on the recording side. The present embodiment is an example in which the cassette management information is also transmitted together with the digital image signal and the digital audio signal, through the digital interface 45.

A reproducing system will first be described.

Upon reproducing, the magnetic head 33 reproduces the signal recorded onto the tape 32 and outputs the same to the demodulation circuit 34. The demodulation circuit 34 demodulates the reproducing signal. The error correction circuit 35 corrects the error of the reproducing signal using the error correction code and separates the packaged information from within the error-corrected reproducing signal into the sub-code, the digital image signal and the digital audio signal.

The analog signal is produced from the output terminals 39 and 41. Specifically, the digital image signal and the digital audio signal from the error correction circuit 35 are given respectively to the image-signal processing circuit 36 and the audio-signal processing circuit 37 so as to be digitally processed. The digital image signal and the digital audio signal are returned to the analog signal by the output processing circuits 38 and 40 and are outputted from the output terminals 39 and 41. The image signal and the audio signal from the output terminals 39 and 41 are given to a monitor device (not shown), to thereby project a reproduced image.

Meanwhile, it is assumed that the information shown in, for example, FIG. 3 is stored as the cassette management information of the cassette 50 in the IC memory 51 which is adhered to the cassette 50 on the reproducing side. It is considered that TITLE 1 to TITLE 4, . . . of the title and the genre of the cassette management information are automatically recorded in Japan in the future on the basis of the broadcasting codes. At present, however, TITLE 1 to TITLE 4, . . . of the title and the genre of the cassette management information are recorded by inputting operation of the user. The other information of the cassette management information is automatically recorded simultaneously with the image signal and the audio signal, on the basis of the signal from a tuner (not shown) of the VTR and the microcomputer 48.

The microcomputer 48 reads the cassette management information from the IC memory 51 through the metal contact 52. The microcomputer 48 extracts the data of the management information recording the program which is reproduced, at present, from the read cassette management information to output the same to the D-IF formatter 49.

Now, it is assumed that the title which is recorded onto the tape 32 of the cassette 50 reproduces the program of TITLE 2, and outputs the reproduced output (dubbing information) as a dubbing output so that the reproduced output is dubbed by the other recording and reproducing apparatus. In this case, the microcomputer 48 extracts the management information of TITLE 2 of the cassette management information in FIG. 3, to output the same to the D-IF formatter 49. In this connection, as shown in FIG. 5, the cassette management information and the sub-code may be arranged at the other region, and as shown in FIG. 6, the management information may be arranged at the sub-code region.

It is next assumed that, following or in continuation to the dubbing output of the program in which the title is TITLE 2, the program in which the title is TITLE 3 is outputted in dubbing. In this case, the microcomputer 48 extracts the cassette management information of TITLE 3 to give the same to the D-IF formatter 49. As shown in FIG. 4, the D-IF formatter 49 packages the cassette management information of TITLE 3, together with the sub-code, the image information and the audio information of the program of TITLE 3, to output the same. The packing data from the D-IF formatter 49 are given to the digital I/F 45 through the input output switching circuit 46 and are outputted to the other recording and reproducing apparatus (now shown).

Operation of a recording system will next be described.

An analog input, including an image signal and an audio signal, is inputted through the terminals 21 and 22. The inputted image signal and audio signal are given to the input processing circuit 23 and the input processing circuit 24 respectively through the input terminals 21 and 22 so as to be converted to digital signals. The image-signal processing circuit 25 and the audio-signal processing circuit 27 respectively process the digital image signal and the digital audio signal and output the same to the terminals a of the switches 26 and 28. When the switches 26 and 28 select the terminals a, the error-correction-coding circuit 29 adds the error correction code to the digital image signal and the digital audio signal from the image-signal processing circuit 25 and the audio-signal processing circuit 27, and packages the same to give the same to the modulation circuit 30. The modulation circuit 30 modulates the packing data and outputs the same to the magnetic head 31, magnetically recording the same onto the tape 32.

Meanwhile, it is assumed that the dubbing input which is transmitted by the formal in FIG. 4 is inputted to the digital I/F 45. Upon dubbing input, the input and output switching circuit 46 selects the dubbing input and outputs the same to the separation circuit 47. The separation circuit 47 separates the digital image signal, the digital audio signal, the sub-code and the management information from the dubbing input, to output the same to the terminals b of the respective switches 26 and 28, the error-correction-code addition circuit 29 and the microcomputer 48, respectively.

The switches 26 and 28 select the terminals b upon dubbing, to supply the digital image signal and the digital audio signal from the separation circuit 47 to the error-correction-coding circuit 29. The error-correction-coding circuit 29 packages the inputted data by the format in FIG. 2 to give the same to the modulation circuit 30. The modulation circuit 30 modulates the packing data to give the same to the magnetic head 31, to thereby record the same onto the tape 32. In this manner, the image, the audio and the sub-code of TITLE 2 in FIG. 4 are recorded onto the tape 32. In this connection, the error-correction-code addition circuit 29 does not use the time code included in the dubbing input, regarding the time code of the sub-code, but uses the time code from the microcomputer 48.

Meanwhile, the cassette management information of TITLE 2 is inputted to the microcomputer 48. of the cassette management information, the inputted to the digital I/F 45. Upon dubbing input, the input and output switching circuit 46 selects the dubbing input and outputs the same to the separation circuit 47. The separation circuit 47 separates the digital image signal, the digital audio signal, the sub-code and the management information from the dubbing input, to output the same to the terminals b of the respective switches 26 and 28, the error-correction-code addition circuit 29 and the microcomputer 48, respectively.

The switches 26 and 28 select the terminals b upon dubbing, to supply the digital image signal and the digital audio signal from the separation circuit 47 to the error-correction-coding circuit 29. The error-correction-coding circuit 29 packages the inputted data by the formal in FIG. 2 to give the same to the modulation circuit 30. The modulation circuit 30 modulates the packing data to give the same to the magnetic head 31, to thereby record the same onto the tape 32. In this manner, the image, the audio and the sub-code of TITLE 2 in FIG. 4 are recorded onto the tape 32. In this connection, the error-correction-code addition circuit 29 does not use the time code included in the dubbing input, regarding the time code of the sub-code, but uses the time code from the microcomputer 48.

Meanwhile, the cassette management information of TITLE 2 is inputted to the microcomputer 48. Of the cassette management information, the information including the title, the genre, the TV channel and the picture-recorded data are transmitted to the IC memory 51 of the cassette 50 as they are and are stored therein. For example, if it is assumed that the cassette management information of TITLE 2 is consistent with the illustration shown in FIG. 3, the cassette management information which indicates that the title is TITLE 2, the genre is 3 (picture), the TV channel is $19^{th}$ channel, and the picture-recorded date is Jun. 14, 1993 is recorded in the IC memory 51, as shown in FIG. 7.

However, the picture-recording start position in the tape on the reproducing side of the TITLE 2 and the picture-recording start position of the tape on the recording side of TITLE 2 are different from each other. That is, rather than merely adopting the time code from the dubbing input, the microcomputer 48 generates the time code of the recording tape 32 and outputs the same to the error-correction-coding circuit 29. The time code is used to store the picture-recording start time code in the IC memory 51. In this connection, as shown in FIG. 7, the information which indicates that the number of the cassette 50 on the recording side is five (5), and the tape length is two (2) hours is recorded on the IC memory 51.

It is assumed that, when the dubbing of TITLE 2 is ended or completed, dubbing of TITLE 3 is continuously or continually performed. In this case, also in the information of the image, the audio and the sub-code of TITLE 3 is packaged by the error-correction-code addition circuit 29, and is recorded onto the tape 32, and the cassette management information of TITLE 3 is created by the microcomputer 48. Similar to the case of TITLE 2, regarding also TITLE 3, only the information regarding the tape position is written based on the new cassette, and the other information is stored in the IC memory 51 as it is. When the picture-recording start time code of TITLEs 2 and 3 is that as shown in FIG. 3, if dubbing is performed from the head of the tape 32 of the cassette 50 on the picture-recording side, the picture-recording start time code which is recorded on the IC memory 51 comes into that shown in FIG. 7, for example. In connection with this, the picture-recording start time code of TITLE 6, which is recorded previously, is written to the picture-recording ending or completion position of TITLE 3.

In this manner, the present embodiment is arrange such that the microcomputer 48 reads out the cassette management information which is stored in the IC memory 51, and the D-IF formatter 49 packages the cassette management information together with the digital image signal, the digital audio signal and the sub-code, to output the same through the digital interface. Thus, it is possible to include the cassette management information in the dubbing output. Further, upon recording of the dubbing input, the separation circuit 47 separates the cassette management information. The microcomputer 48 creates the cassette management information of the recording cassette on the basis of the cassette information which is included in the dubbing input, to store the same into the IC memory 51. Thus, it is possible to automatically record the cassette information of the program to be dubbed onto the cassette management recording medium on the recording side.

In connection with the above, the present embodiment describes an example in which only the cassette management information of the program which performs dubbing output is extracted and transmitted together with the image and audio information. However, the arrangement may be such that all the cassette management information is read by the microcomputer and transmitted to the recording side, and the cassette management information required on the recording side is selected and is recorded. Moreover, the arrangement may be such that the cassette management information is transmitted prior to the image information and the audio information, the time code is extracted on the recording side from the sub-code which is transmitted together with the image information and the audio information, and the cassette management information of the program to be dubbed is judged from the time code, to select the corresponding cassette management information by the microcomputer. Furthermore, in FIG. 4, the management information of TITLE m is arranged. However, the arrangement may be such that all the management information is arranged on this portion and is transmitted, and only the cassette management information which is required on the recording side is extracted and is recorded.

In connection with the above, the information-signal reproducing apparatus according to the embodiment of the invention can be formed by the reproducing system in FIG. 1, the microcomputer 48 and the D-IF formatter 49, and the information-signal recording apparatus according to the embodiment of the invention can be formed by the recording system, and the microcomputer 48 and the separation circuit 47.

Figure 8:
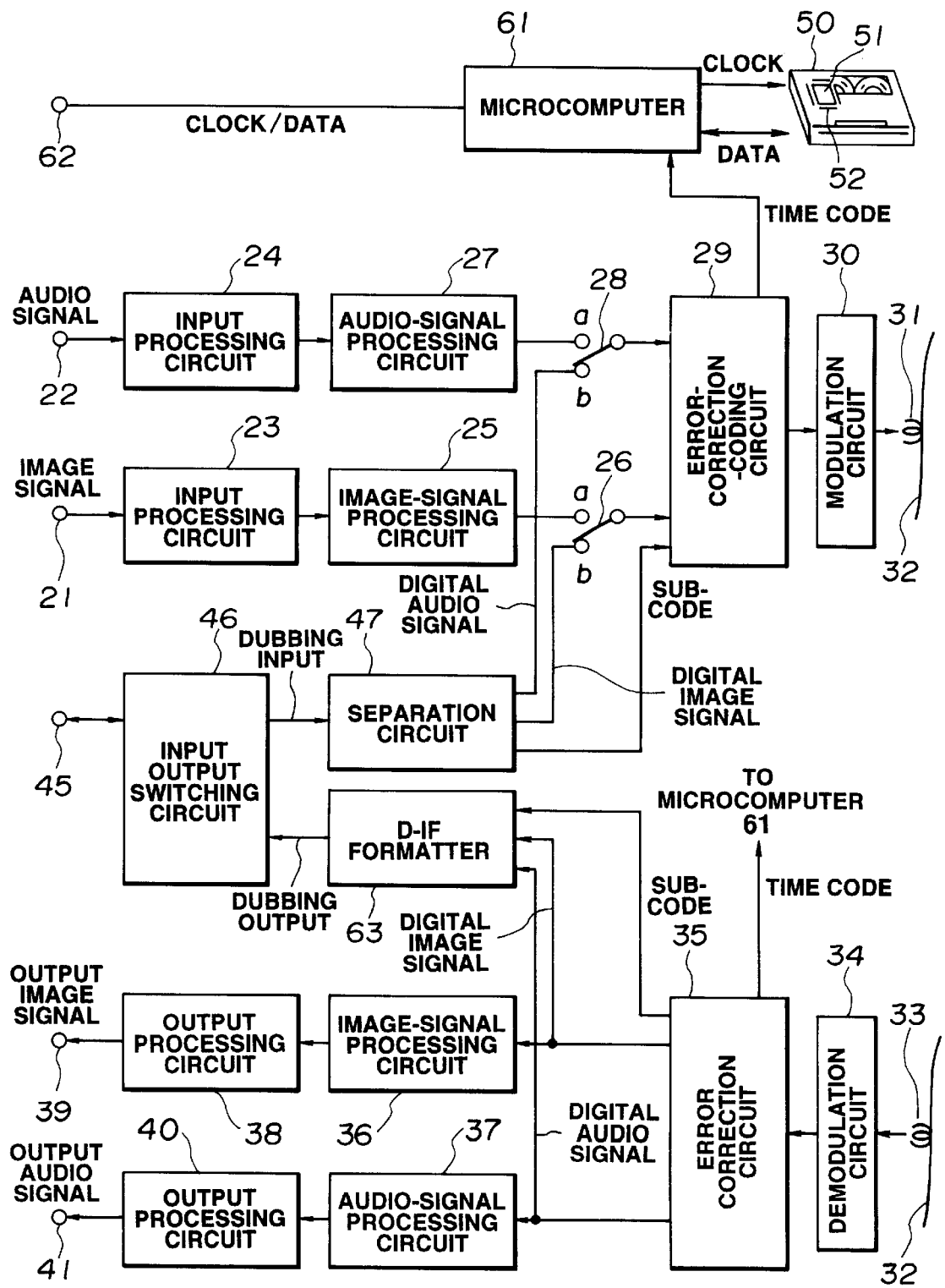
FIG. 8 is a block diagram showing another embodiment of the invention.

FIG. 8 is a block diagram showing another embodiment of the invention. In FIG. 8, the same reference numerals are applied to elements corresponding to those illustrated by FIG. 1, and the description thereof will be omitted. The present embodiment is an example in which the cassette management information is transmitted along a path different from that of the image an audio dubbing information.

In FIG. 1, the cassette management information is transmitted by the transmitting system the same as the digital image and audio signals. However, in the present embodiment, in consideration of case where the digital I/F is not had like the analog VTR, the cassette management information cannot be included in the digital interface format or the like. Thus, a transmitting system exclusive or dedicated for the cassette management information is provided.

A VTR body (not shown) is provided with an external input output terminal 62 for transmitting cassette management information. The external input output terminal 62 enables data and clock to be transmitted with respect to a microcomputer 61. The arrangement is such that the microcomputer 61 is capable of transmitting the data and the clock with respect to an IC memory 51 which is attached on a cassette 50, and the microcomputer 61 reads out cassette management information which is stored in the IC memory 51, and the created cassette management information is given to the IC memory 51 and is stored therein. In this connection, a D-IF formatter 63 packages the digital image signal, the digital audio signal and the sub-code from an error correction circuit 35 by the digital interface format, the output the same as the dubbing output.

In the embodiment arranged in this manner, the cassette management information which is read out by the microcomputer 61 can be outputted to the other recording apparatus through the external input/output terminal 62, and the cassette management information from the other reproducing apparatus can be supplied to the microcomputer 61 through the external input/output terminal 62. In this connection, the arrangement may be such that the microcomputer 61 transmits only the cassette management information of the program which performs dubbing input and output, simultaneously with the dubbing input and output. The arrangement may also be such that the microcomputer 61 transmits all the cassette management information on the reproducing side, judges the corresponding cassette management information on the recording side based on the time code included in the sub-code, and creates and records the cassette management information of the recording cassette based on the selected cassette management information.

Figure 9:
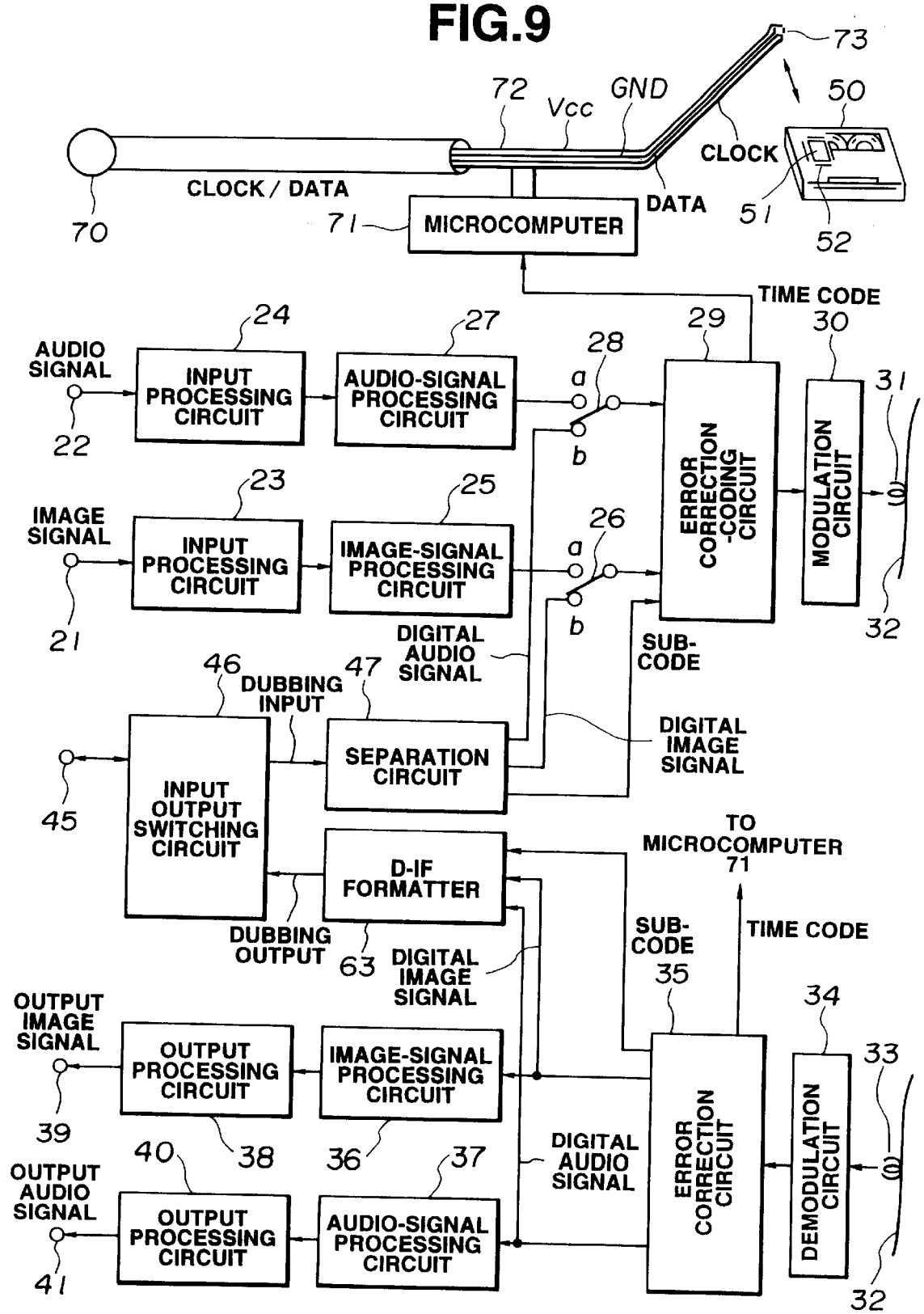
FIG. 9 is a block diagram showing another embodiment of the invention.
Figure 10:
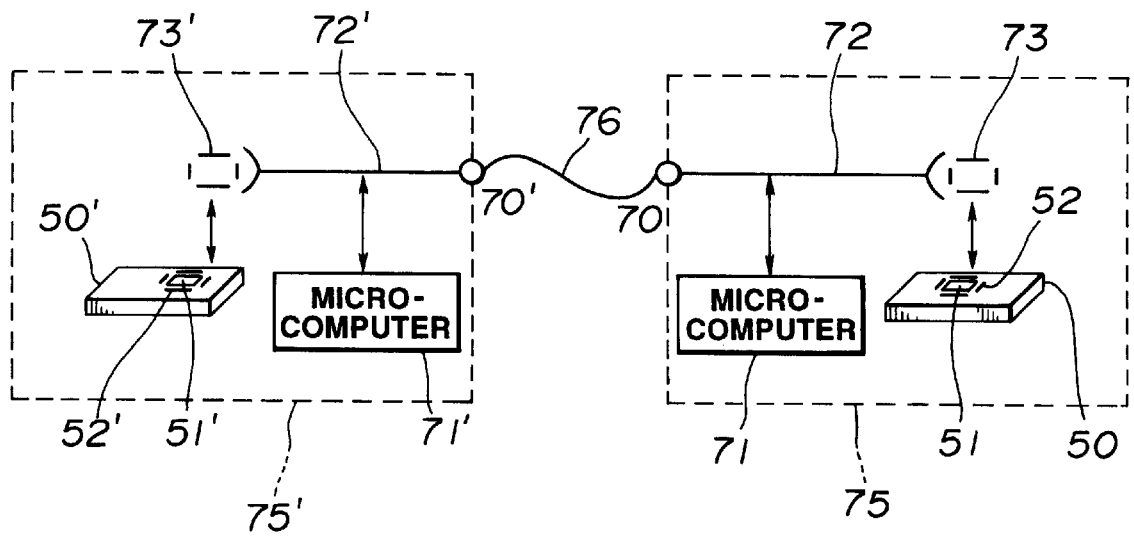
FIG. 10 is an explanatory view for the description of the embodiment illustrated in FIG. 9.
Figure 11:
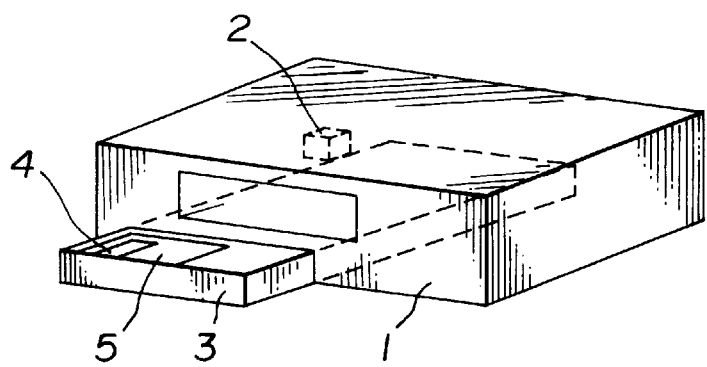
FIG. 11 is an explanatory view for the description of a bar code label which records cassette management information.
Figure 12:
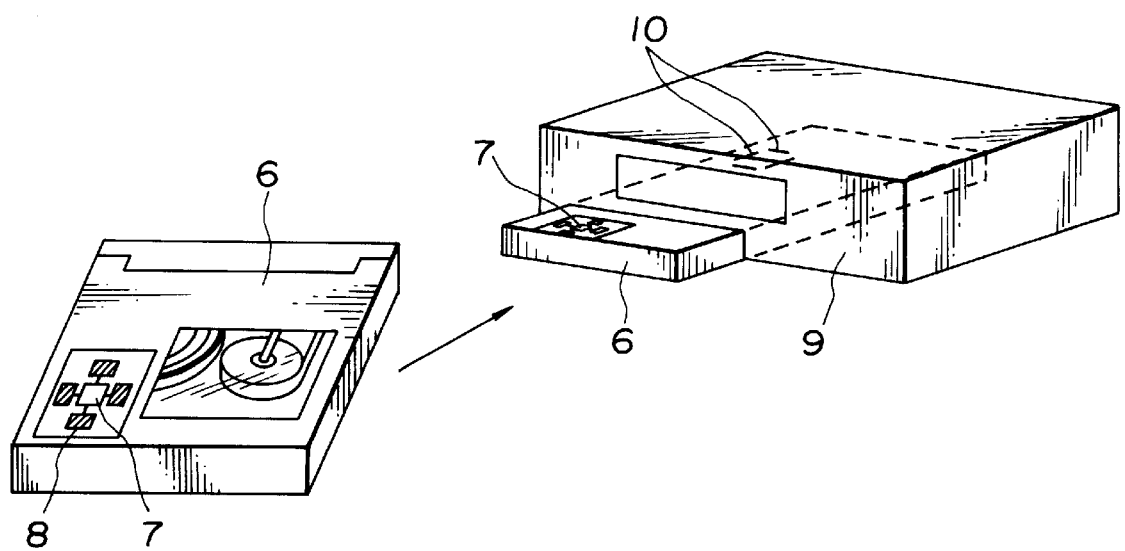
FIG. 12 is an explanatory view for the description of an IC memory which records the cassette management information.
Figure 14:
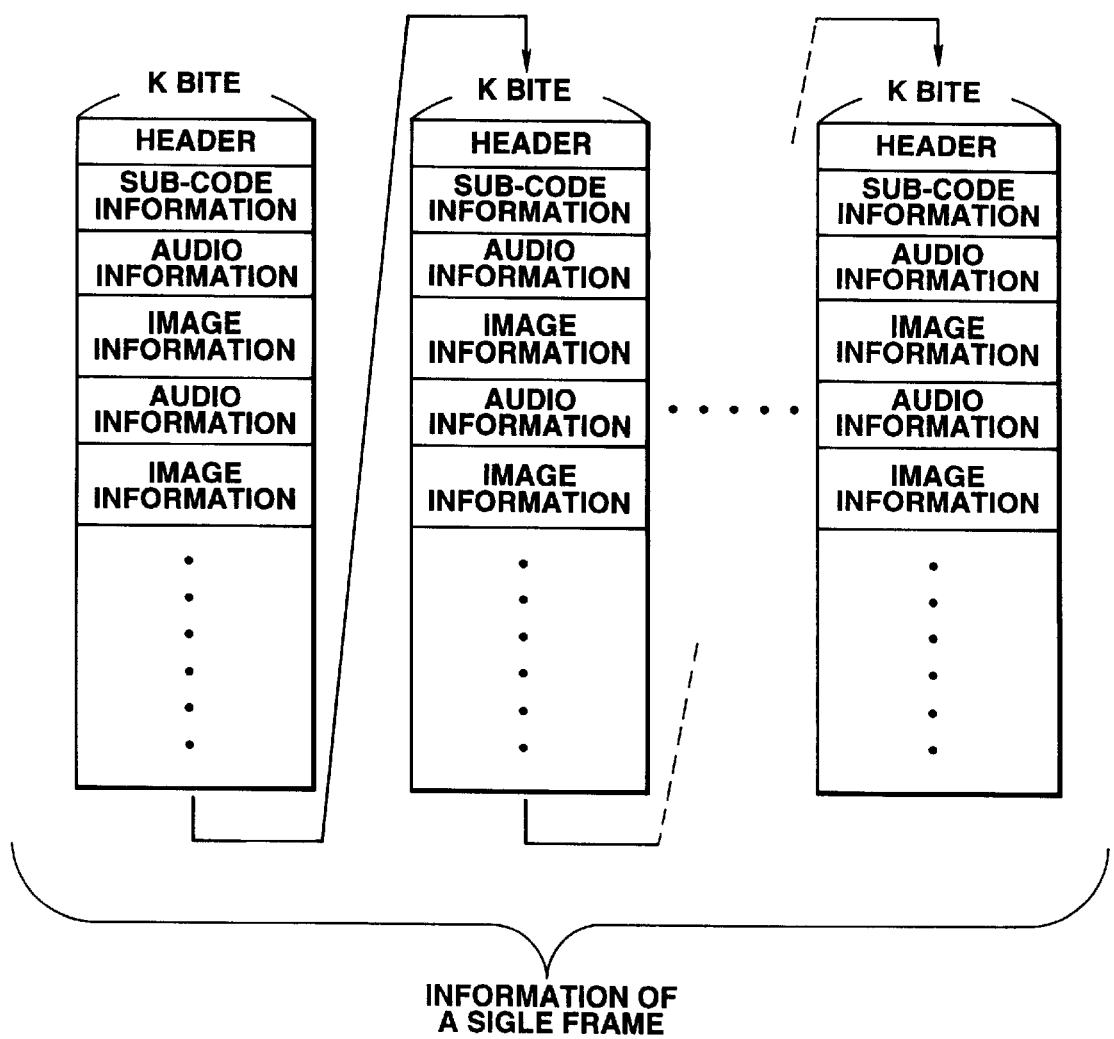
FIG. 14 is an explanatory view for the description of a digital interface format in the prior art.

FIG. 9 is a block diagram showing another embodiment of the invention. Further, FIG. 10 is an explanatory view for describing transmission of the cassette management information according to the embodiment in FIG. 9. In FIG. 9, the same reference numerals are applied to elements corresponding to those illustrated by FIG. 8, and the description thereof will be omitted. The present embodiment is an example in which the cassette management information is transmitted by a transmitting path different from that of the dubbing data of the image information and the audio information, similar to the embodiment in FIG. 8.

In FIGS. 9 and 10, a casing of VTR 75 is provided with an external input output terminal 70 for transmitting the cassette management information. The external input output terminal 70 is connected to a microcomputer 71 and a contact 73 through a bus 72. The bus 72 is formed by, for example, IICBUS, and has a power-source line Vcc, a ground line GND, and a data line and a clock line. The contact 73 is capable of being connected to a metal contact 52 which is connected to the IC memory 51. The microcomputer 71 is arranged such that either the contact 73 or the external input output terminal 70 are capable of transmitting the data through the bus 72.

In the embodiment arranged in this manner, as shown in FIG. 10, a pair of VTRs 75 and 75', which are the same in arrangement as those in FIG. 9, are connected between a pair of external input output terminals 70 and 70' by a cable 76. Thus, the contact 73 is connected to the microcomputer 71 by the bus 72, and is also connected to a microcomputer 71' of the VTR 75' through the external input output terminal 70, the cable 76, the external input output terminal 70' and a bus 72'. The microcomputer 71' is the same in arrangement as the microcomputer 70. The microcomputer 71' can read out cassette management information from the IC memory 51 of a cassette 50 which is mounted on the VTR body 75, through the metal contact 52 connected to the contact 73, similar to the microcomputer 71. Similarly, the microcomputer 71 can also directly read out the cassette management information of an IC memory 51' of a cassette 50' which is mounted on the VTR 75'.

Now, it is assumed that the dubbing output from the side of the VTR 75' is recorded on the side of the VTR 75. The microcomputer 71 is capable of communicating with the bus 72 when the bus 72 is not BUS BUSY, that is, when the microcomputer 71' does not perform communication. When the dubbing signal of the image and the audio from the VTR 75' is recorded in dubbing in the VTR 75, the microcomputer 71 performs communication with respect to the bus 72, and directly reads the cassette management information from the IC memory 51' of the cassette 50' on the reproducing side. The microcomputer 71 judges the corresponding cassette management information from the time code which is included in the program under dubbing at present and extracts the same. The microcomputer 71 creates the cassette management information form the recording cassette 50, on the basis of the extracted cassette management information, and writes the same to the IC memory 51 through the bus 72.

The embodiment illustrated in FIGS. 9 and 10 may be arranged such that only the cassette management information regarding the program being transmitted is transmitted, similar to the embodiment in FIG. 1. Further, the arrangement may also be such that all the cassette management information is transmitted, and only the corresponding cassette management information is extracted on the recording side, and is recorded. Moreover, it is also similar to those in the embodiment in FIG. 1 to rewrite the recording start time code to information on the recording side without the use of the transmitted cassette management information, and to record the time code in the sub-code by the use of the information on the recording side.

In these embodiments, the cassette management information on the reproducing side is automatically recorded onto the cassette management information recording medium which is provided on the cassette on the recording side upon transmission of the image and audio signals. Accordingly, the microcomputer of the apparatus on the recording side can grasp the information time (reproducing time) of the program which is inputted in dubbing from the cassette management information. Moreover, the microcomputer of the apparatus on the recording side can calculate or compute the remaining recording capacity of the recording tape from the present time code and the cassette tape length included in the cassette management information of the recording cassette. Accordingly, the microcomputer of the apparatus on the recording side can judge, before recording, the fact that the remaining recording capacity of the tape on the recording side is less or shorter than the reproducing time of the program to be dubbed, and can also warn the capacity insufficiency or shortage by display onto the deck body, by image-plane display due to on-screen characters, or the like, for example. In this manner, it is also possible to previously notify the user of the fact that recording ends on the way of recording. Thus, it is possible to prevent deficiencies such as redoing of dubbing and the like.

In this invention, it is apparent that working modes different in a wide range can be formed on the basis of this invention without departing from the spirit and scope of the invention. This invention is not restricted by any specific embodiment except being limited by the appended claims.

What is claimed is:

1. A method of recording and reproducing information-signals, including the steps of:
  reproducing information from a first cassette, the reproducing step including the steps of:
    reproducing some but not all dubbing information recorded on a first recording medium of the first cassette,
    reproducing some but not all cassette management information recorded on a second recording medium of the first cassette, and
    generating a dubbing output based on both the dubbing information reproduced from the first recording medium and the cassette management information reproduced from the second recording medium,
    where the cassette management information reproduced from the second recording medium of the first cassette corresponds to the dubbing information reproduced from the first recording medium of the first cassette; and
  recording information on a second cassette based on the dubbing output, the recording step including the steps of:
    generating dubbing information and cassette management information based on the dubbing output,
    recording the dubbing information generated onto a first recording medium of the second cassette, and
    recording the cassette management information generated onto a second recording medium of the second cassette,
  where the dubbing information being recorded on the first recording medium of the second cassette includes some but not all dubbing information on the first recording medium of the first cassette, and the cassette management information being recorded on the second recording medium of the second cassette includes some but not all cassette management information recorded on the second recording medium of the first cassette, the cassette management information recorded on the second recording medium of the second cassette corresponding to the dubbing information recorded on the first recording medium of the second cassette.

2. A method of recording and reproducing information-signals according to claim 1, wherein the step of generating a dubbing output includes multiplexing the dubbing information reproduced from the first recording medium of the first cassette and cassette management information reproduced from the second recording medium of the first cassette.

3. A method as recited by claim 1, wherein the cassette management information is reproduced automatically when the dubbing information is reproduced, and wherein the cassette management information is recorded automatically when the dubbing information is recorded.

4. A method as recited by claim 1, wherein a relationship between the reproduced cassette management information and other cassette management information recorded on said second recording medium corresponds to a relationship between the reproduced dubbing information and other information recorded on the first recording medium, and wherein a relationship between the cassette management information being written in the second recording medium and other cassette management information recorded on said second recording medium corresponds to a relationship between the dubbing information being recorded in the first recording medium and other information recorded on the first recording medium.

5. A method as recited by claim 1, where the first recording mediums of the first and second cassettes are respectively disposed within the first and second cassettes and the second recording mediums of the first and second cassettes are respectively provided on the first and second cassettes.

6. An information signal recording and reproducing apparatus comprising:
  a reproducing device including:
    first reproducing means for reproducing some but not all dubbing information recorded on a first recording medium of a first cassette,
    second reproducing means for reproducing some but not all cassette management information recorded on a second recording medium of the first cassette, and
    transmitting means for generating and transmitting a dubbing output including both the dubbing information reproduced by the first reproducing means and the cassette management information reproduced by the second reproducing means, where the cassette management information reproduced by the second reproducing means corresponds to the dubbing information reproduced by the first reproducing means;

input means for receiving the dubbing output and for generating dubbing information and cassette management information from the dubbing output; and a recording device including:

first recording means for recording the dubbing information generated by the input means onto a first recording medium of a second cassette, and second recording means for recording the cassette management information generated by the input means onto a second recording medium of the second cassette, where the dubbing information recorded by the first recording means includes some but not all dubbing information on the first recording medium of the first cassette, and the cassette management information recorded by the second recording means includes some but not all cassette management information on the second recording medium of the first cassette, the cassette management information recorded by the second recording means corresponding to the dubbing information recorded by the first recording means.

7. An information-signal recording and reproducing apparatus according to claim 6, wherein the transmitting means generates the dubbing output by multiplexing the dubbing information reproduced by the first reproducing means and cassette management information reproduced by the second reproducing means.

8. An information-signal recording and reproducing apparatus according to claim 6, wherein the transmitting means generates the dubbing output by multiplexing the dubbing information reproduced by the first reproducing means and cassette management information reproduced by the second reproducing means which are digitalized.

9. An information-signal recording and reproducing apparatus according to claim 6, wherein the reproducing device and recording device are separate devices.

10. An apparatus as recited by claim 6, wherein the cassette management information is reproduced automatically when the dubbing information is reproduced, and wherein the cassette management information is written automatically when the dubbing information is recorded.

11. An apparatus as recited by claim 6, wherein a relationship between the cassette management information reproduced by the second reproducing means and other cassette management information recorded on said second recording medium corresponds to a relationship between the dubbing information reproduced by the first reproducing means and other information recorded on the first recording medium, and wherein a relationship between the cassette management information being recorded by the second recording means on the second recording medium and other cassette management information recorded on said second recording medium corresponds to a relationship between the dubbing information being recorded by the first recording means on the first recording medium and other information recorded on the first recording medium.

12. An apparatus as recited by claim 6, where the first recording mediums of the first and second cassettes are respectively disposed within the first and second cassettes and the second recording mediums of the first and second cassettes are respectively provided on the first and second cassettes.

* * * * *